US007891696B2

(12) United States Patent
Hanson

(10) Patent No.: US 7,891,696 B2
(45) Date of Patent: Feb. 22, 2011

(54) MULTIFUNCTIONAL FOLDABLE MOBILITY BASE

(76) Inventor: Wayne H. Hanson, 312 B Andrea Dr., Belgrade, MT (US) 59714

( * ) Notice: Subject to any disclaimer, the term of this patent is extended or adjusted under 35 U.S.C. 154(b) by 72 days.

(21) Appl. No.: 12/485,656

(22) Filed: Jun. 16, 2009

(65) Prior Publication Data

US 2009/0309336 A1 Dec. 17, 2009

Related U.S. Application Data

(60) Provisional application No. 61/073,217, filed on Jun. 17, 2008.

(51) Int. Cl.
*B62B 3/02* (2006.01)

(52) U.S. Cl. .................... 280/647; 280/47.41; 297/325; 297/344.1

(58) Field of Classification Search ............. 280/250.1, 280/304.1, 642, 647, 650, 657, 47.38, 47.41; 297/325, 344.1, 344.12, 344.13, 344.14
See application file for complete search history.

(56) References Cited

U.S. PATENT DOCUMENTS

| | | | | |
|---|---|---|---|---|
| 5,361,494 | A * | 11/1994 | Robertson et al. | 29/897.2 |
| 5,997,021 | A * | 12/1999 | Robinson et al. | 280/250.1 |
| 6,032,975 | A | 3/2000 | Hanson et al. | |
| 6,206,405 | B1 | 3/2001 | Watkins | |
| 6,264,225 | B1 * | 7/2001 | Kunishige et al. | 280/250.1 |
| 6,270,111 | B1 * | 8/2001 | Hanson et al. | 280/650 |
| 7,455,362 | B2 * | 11/2008 | Hanson et al. | 297/363 |
| 2005/0029855 | A1 | 2/2005 | Hanson et al. | |

FOREIGN PATENT DOCUMENTS

| | | |
|---|---|---|
| EP | 1374818 | 11/2006 |
| JP | 2000-168571 | 6/2000 |
| JP | 2002-087271 | 3/2002 |

OTHER PUBLICATIONS

International Search Report and Written Opinion from corresponding International Application No. PCT/US2009/047618, dated Jan. 26, 2010.

* cited by examiner

*Primary Examiner*—J. Allen Shriver, II
*Assistant Examiner*—John D Walters
(74) *Attorney, Agent, or Firm*—Greenberg Traurig, LLP

(57) ABSTRACT

A foldable wheel chair or mobility base is disclosed that comprises a chair portion and a wheeled frame. The chair portion has a back hinged to a seat. The frame supports the chair portion, a spaced pair of front wheel caster assemblies and a spaced pair of rear wheels. A lower end of the back of the chair portion attaches to the frame via two spaced brackets which are slidably connected to upright curved rear support members such that they can be moved along the curved rear support members to permit adjustment of the chair tilt between predetermined stop positions along the curved rear support members without changing a seat to back angle. The chair portion is connected to the frame via front support members and diagonal struts connected to common pins fastened to each of the front wheel caster assemblies. The other end of each diagonal strut is hinged to one of the spaced brackets. The chair preferably provides a different distance between front and rear wheels at different seat to back angles and tilt positions of the chair portion. Further, the configuration permits virtually independent adjustment of chair portion tilt, seat to back angles and permits a separate dynamic movement of the seat to back angle to facilitate therapeutic exercise capability for a chair occupant.

20 Claims, 10 Drawing Sheets

MULTIFUNCTIONAL FOLDABLE MOBILITY BASE

RELATED APPLICATION

This application claims the benefit of and priority to U.S. Provisional Application Ser. No. 61/073,217, filed Jun. 17, 2008, the contents of which are incorporated by reference herein in its entirety.

BACKGROUND

This disclosure relates to wheel chairs and more particularly to a folding mobility base, or wheel chair, that functions in a variety of positions and enables a user to choose between various selectable adjustments.

SUMMARY

A foldable wheel chair in accordance with the present disclosure comprises a chair portion having a back hinged to a seat at first hinges. A wheeled frame supports the chair portion, and has a pair of laterally spaced front wheel assemblies and a pair of laterally spaced rear wheels. A front end of the seat pivotally attaches to the frame via a pair of hinged front supports. Each of the hinged front supports is pivotally attached to one of the front wheel assemblies at a common pivot point. A lower end of the back of the chair portion attaches to the frame via two spaced brackets, which are, in turn, also attached via diagonal struts to the common pivot point in each of the front wheel assemblies. This connection through the common pivot points causes the wheel base of the wheel chair to change as the seat to back angle is changed such that stability of the chair increases as the seat to back angle increases.

Each bracket is slidably connected to one of a pair of spaced apart upright curved rear support members. These rear brackets are selectively movable along the pair of curved rear support members. This selective movement permits tilt adjustment of the chair portion between predetermined stop positions along the upright curved rear supports to provide multiple tilt positions of the chair portion on the frame without substantively altering a selected seat to back angle of the chair portion.

The seat back preferably includes a tubular frame. The lower ends of the seat back frame tube are attached to the spaced brackets via pivot links at second hinges and the back can be adjustably positioned with respect to the bracket to adjust the chair seat to back angle between predetermined seat to back angle positions. The rear edges of the spaced brackets include notches for each predetermined seat to back angle. Each seat back pivot link is rigidly attached to each side of the lower end of the seat back frame tube and pivots about the second hinges. Each seat back pivot link has a stem portion that extends rearward adjacent the rear edges of the brackets that carry the notches. A spring biased seat to back adjustment bar extends laterally through slots in the seat back pivot links to removably engage selected ones of the notches in the spaced brackets to establish the desired seat to back angle. The spring bias may be provided by an elastic biasing member such as a coil spring, elastic or rubber band, etc.

The curved rear support members are each attached at its lower end to an axle that spans between the pair of rear wheels. Each of the front wheel assemblies is spaced from its corresponding rear wheel by a strut that is hinged to a spacer plate fastened to the upright support member. This hinge may be at a location on the curved rear support member above and forward of the axle such that a change of the chair portion tilt between the predetermined stop positions along the upright curved rear supports causes the distance between the front wheels and the rear wheels to be different at each of the tilt positions. Thus each tilt position of the chair portion on the frame carries with it a corresponding different distance, or wheelbase, between the front and rear wheels.

An alternative embodiment of the mobility chair further provides capability for dynamic movement of the seat to back angle in order to permit an occupant of the chair to stretch and exercise his or her back muscles and leg muscles while sitting in the chair. This embodiment includes a bracket design that permits the second hinges to be selectively released or unlatched. This permits dynamic movement of the seat to back angle from each of the predetermined seat to back angles. When the first hinges are released, the seat back hinge location changes such that it hinges about third hinges formed by the adjustment bar positioned in the selected ones of the notches engaging the stem portion of the seat back pivot links. An elastic biasing device may be coupled between the seat back and the brackets to provide some resistance against dynamic movement in this embodiment. At the same time, as an occupant pushes to enlarge the seat to back angle, the wheel base of the chair increases to increase stability of the chair at the larger seat to back angle.

BRIEF DESCRIPTION OF THE DRAWINGS

The above-mentioned features and objects of the present disclosure will become more apparent with reference to the following description taken in conjunction with the accompanying drawings wherein like reference numerals denote like elements.

DETAILED DESCRIPTION

A foldable multiply adjustable motion wheel chair 100 according to one embodiment of the present disclosure is shown in FIGS. 1-11. The wheel chair 100 according to the present disclosure has a folding base frame portion, and a folding chair portion that are integrally connected together. This configuration permits at least two separate and substantially independent adjustments for an occupant of the wheel chair 100. First, the seat to seat back angle may be adjusted. Second, a tilt position of the entire chair portion may be adjusted. Third, in an optional configuration, a dynamic changing of the seat to back angle may be accommodated. Fourth, in a similar manner, a dynamic changing of the foot bed or foot rest may also be accommodated. These third and fourth configurations permit therapeutic movement opportunities for the chair occupant.

Figure 1:
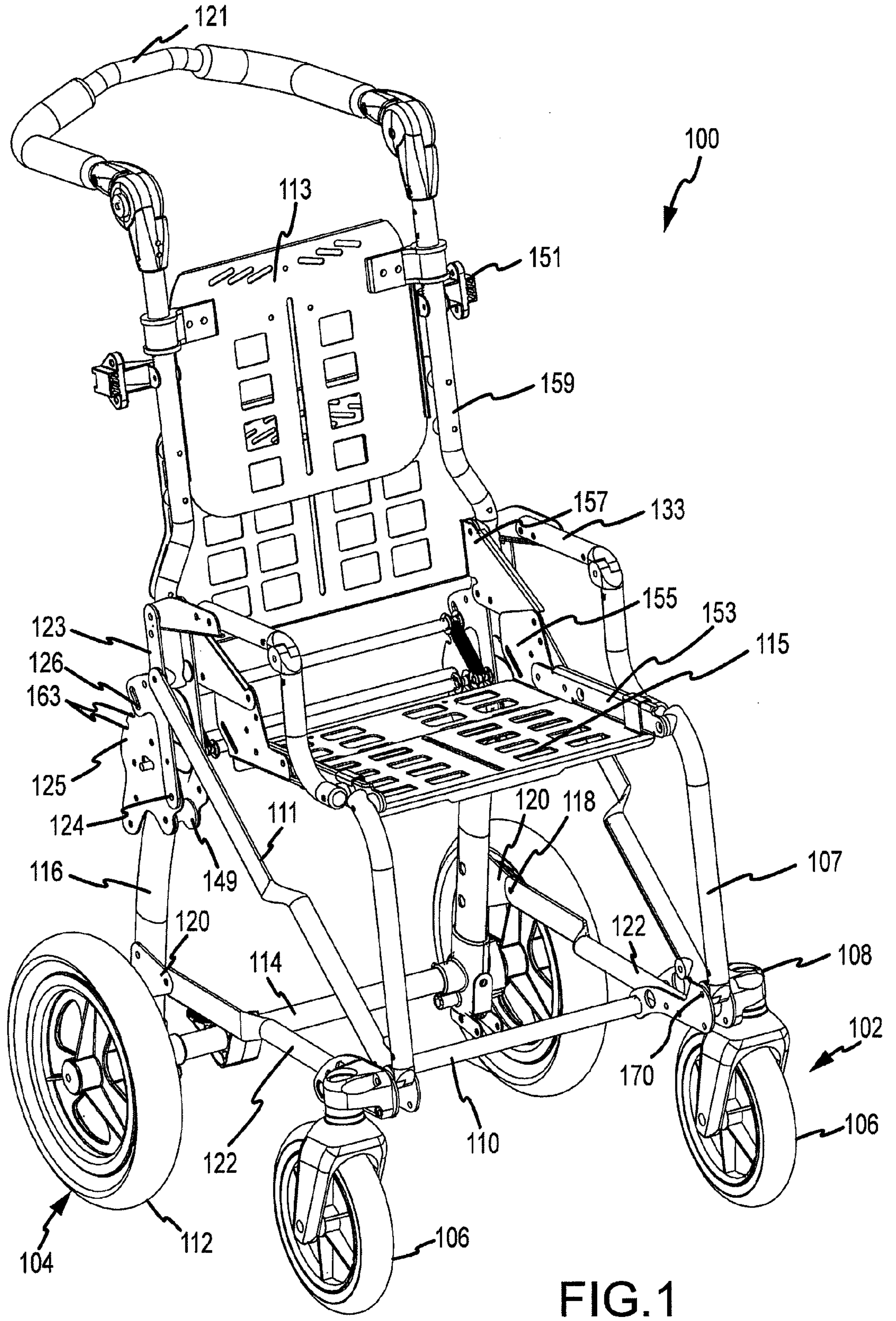
FIG. 1 is a front perspective view of a wheel chair in accordance with an embodiment of the present disclosure.
Figure 2:
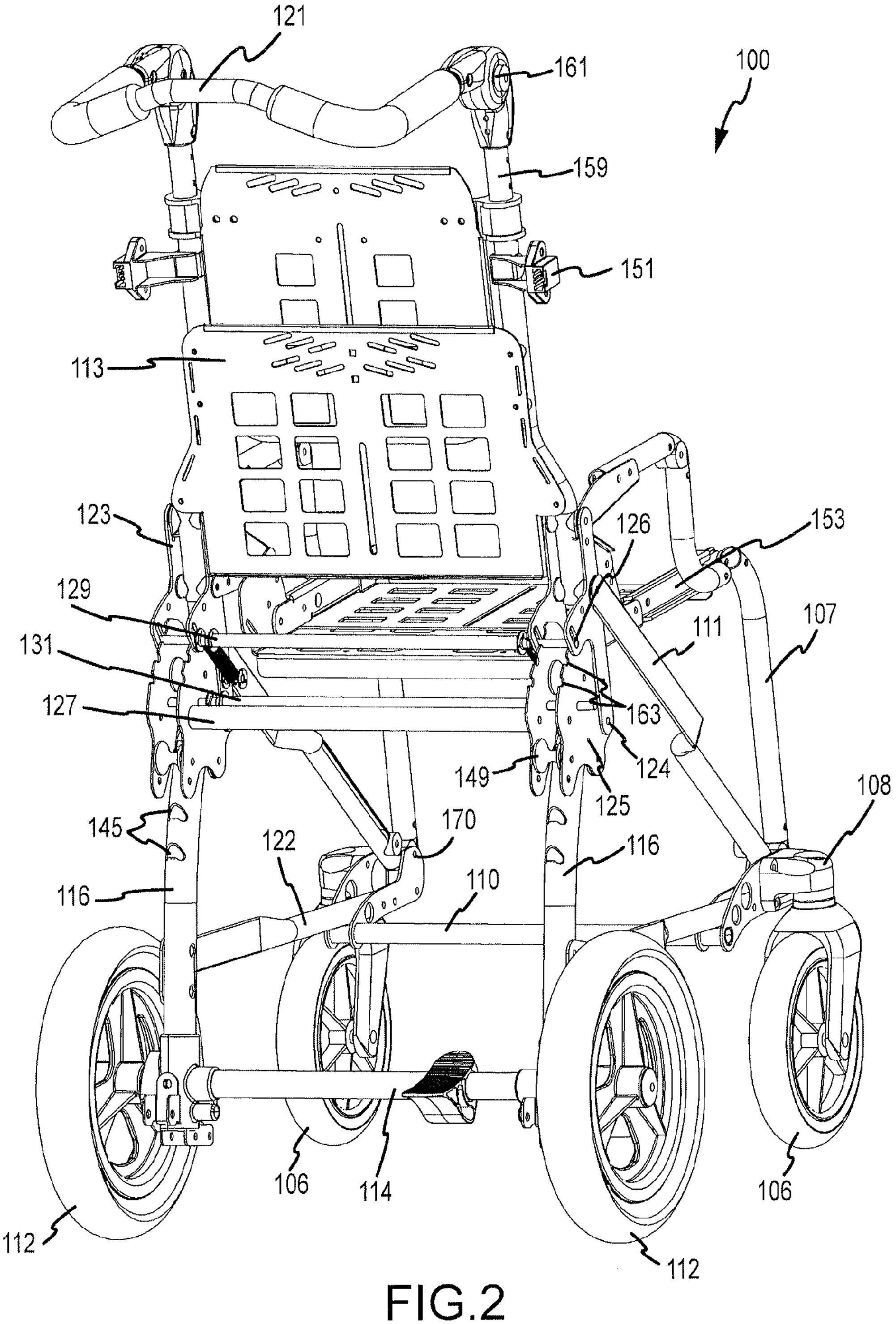
FIG. 2 is a rear perspective view of a wheel chair in accordance with an embodiment of the present disclosure.

A front perspective view and rear perspective view of the wheel chair 100 are shown in FIGS. 1 and 2. The mobility base frame portion includes a front wheel assembly 102 and a rear wheel assembly 104. The front wheel assembly 102 includes a pair of spaced wheels 106 each carried by a front caster assembly 108. The front caster assemblies 108 are spaced laterally apart by a cross tube 110.

The rear wheel assembly 104 includes a pair of spaced rear wheels 112 that are spaced laterally apart by an axle 114. Attached rigidly to the axle 114 adjacent each rear wheel 112 is the bottom end of an upright curved support member 116. The upper end of each upright curved support member 116 carries a bracket 125 supporting the chair portion that will be further described below. Each curved upright curved support member 116 may have a generally triangular frame extender plate 120 that is rigidly fastened to a lower portion of the support member 116 spaced above the axle 114. This plate 120 extends forward toward the front wheel assembly 102. The rear wheel assembly 104 further has a squish tube or strut 122 that is connected to the plate 120 at hinge 118. The strut 122 extends forward to the front caster assembly 108 in line with the rear wheel 112.

The chair portion basically has a seat back 113 and a seat bottom 115. The seat back 113 and seat bottom 115 are structurally connected to the mobility base frame portion such that expansion of the seat to back angle or the a change in the overall tilt of the chair portion causes a change in the wheel base of the chair 100 which enhances the stability of the wheel chair 100.

The seat bottom 115 is connected to a generally rectangular seat bottom frame 153, which is in turn hinged to a seat back frame 159. A pair of substantially vertical front supports 107 extend from a front edge of the seat bottom 115 downward at about a right angle and are hinged at common hinge pins 170 to the front caster assemblies 108. A set of hinged arm rests 133 extend from the seat back 113 to the front of the seat bottom 115.

Figure 10:
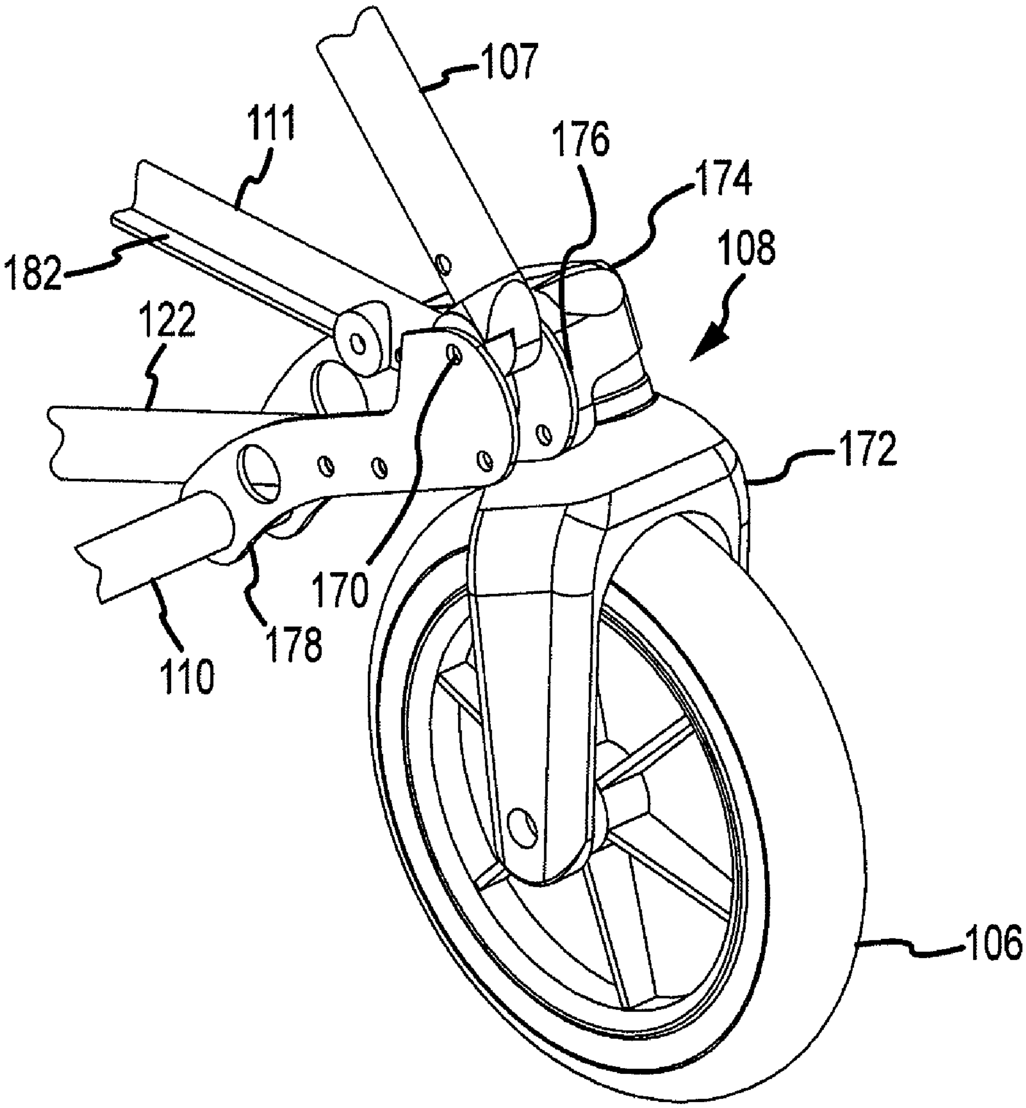
FIG. 10 is an enlarged perspective view of one of the front wheel assemblies of the wheel chair shown in FIG. 1.

An enlarged view of one of the front wheel caster assemblies 108 is shown in FIG. 10. Wheel 106 is supported by a yoke 172 which is, in turn, swivel mounted in a caster block 174. This caster block 174 is bolt fastened to an outer caster plate 176 which is laterally spaced from an inner caster plate 178. Between the inner caster plate 178 and the outer caster plate 176 are captured the lower end of the upright seat support 107, the lower end of the diagonal strut 111, and a forward end of strut 122. In addition, the lateral strut 110 that extends between the caster assemblies 108 is fastened at each end to a rear portion of each of the plates 176 and 178. The lower ends of each of the diagonal strut 111 and the upright seat support 107 are hinged and rotatably fastened together between the caster plates 176 and 178 via a common connection pin 170 such that they can rotate in vertical planes about pin 170 when the tilt angle is changed as described below, without changing the selected seat to back angle, as is also described below.

The rear of the seat bottom 115 is slidably attached to a generally rectangular seat bottom frame 153. The seat bottom frame 153 is rigidly fastened, to a pair of upright hinge plates 155 on opposite sides of the bottom frame 153. The hinge plates 155 are in turn hinged to a pair of seat back plates 157. The seat back plates 157 are each rigidly fastened at a right angle to one side of the seat back frame 159. The configuration of seat bottom frame 153, the hinge plate 155, the seat back plate 157 and the seat back frame 159 together allows the angle between the seat back 113 and the seat bottom 115 to be varied by hinged rotation around the connections between the intermediate plate 155 and the seat back plate 157 at a raised location that generally corresponds to a chair occupant's hip joints.

The seat back 113 is supported by the seat back frame 159. The seat back 113 may include one or more generally flat plate shaped pieces that are adjustably mounted on the seat back frame 159. The seat back frame 159 is preferably made of tubular members. Attached to the seat back frame 159 can be various attachments 151 to attach umbrellas, sun shades, hooks for hanging bags or the like. An extension 121 of the seat back frame 159 forms a U shaped push hand grip for the wheel chair 100. The push hand grip 121 is mounted to the frame 159 with hinge members 161 as shown in FIG. 2. The hinge members 161 allow a user to change the position of the handle 121 with respect to the frame 159 by a selected amount and then allow the user to lock the handle 121 at the selected position.

As shown in FIGS. 1 through 11, the seat 115 and back 113 include flat plate structures. Alternatively the seat 115 and back 113 may simply have rigid outer frames and flexible webbing therebetween instead of the plate shapes 113 and 115, as shown. In addition, the seat and back, as well as the other structural members described herein, may be constructed of molded plastic parts, metal or of materials other than as specifically shown in the drawing. In the embodiment illustrated, seat and back cushions (not shown) are preferably provided for the comfort of an occupant of the chair 100.

A pair of generally T shaped seat back pivot link plates 123 are rigidly attached parallel to and extend downward from each bottom end of the tubular seat back frame 159 on both sides of the seat back 113. Thus there are two pairs, or four total, T shaped seat back pivot links 123. An upper end of the head portion of each pair of the T shaped pivot link plates 123 is rigidly attached to the frame 159. The opposite, or lowest, end of the head portions of the pair of T shaped pivot links 123 are pivotally attached, i.e. hinged, to brackets 125 at hinge connection points 124 as described further below.

There are two pairs, or four total, brackets 125 that are spaced apart beneath and behind the back of the seat 115. Each bracket 125 is a solid flat plate. Each pair of brackets 125 is rigidly spaced in position by a set of three spool shaped spacers 149. The spacers 149 permit each pair of brackets to slide up and down the length of one of the upright curved supports 116. The inner brackets 125 of each pair are spaced from and rigidly attached to each other by a static crossbar 127 as is shown in FIG. 2. The back pivot links 123 are each hinge connected to the brackets 125 at a first point of connection 124.

The rear edge portion of each of the brackets 125 is provided with a series of spaced back tilt notches 163. The back tilt notches 163 provide an adjustable connection to the seat back pivot links 123 at a second point of connection 126 such that the seat back pivot links 123, that pivot about the first point of connection 124 can be locked in different selectable positions at the second point of connection 126 for varying the angle between the seat back 113 and the seat bottom 115 as will be further described below.

The seat back pivot links 123 each have a stem portion that extends rearward from the head portion of the T shape. The stem portion has a first slot for receiving one end of a seat back tilt crossbar 129. The seat back tilt crossbar 129 extends laterally between the pairs of seat back pivot links 123 on either side of the wheel chair 100. The seat back tilt crossbar 129 engages the back tilt notches 163 in the brackets 125 to form the second point of connection 126 thereby locking the seat back pivot links 123 in a position relative to the brackets 125. This first slot has a length to permit the seat back tilt crossbar 129 to engage and disengage one of the notches 163. Movement of the crossbar 129 between the notches 163 permits adjustment of the angle between the seat 115 and seat back frame 159. The seat back tilt crossbar 129 is spring biased toward the back tilt notches 163 but can be pulled outwardly causing the seat back tilt crossbar 129 to disengage from the back tilt notches 163. After disengaging the seat back tilt crossbar 129 from the back tilt notches 163 the seat back pivot links 123 can be rotated about the brackets 125 to thereby change the angle of the seat back 113 and frame 159 relative to the seat bottom 115.

Figure 7:
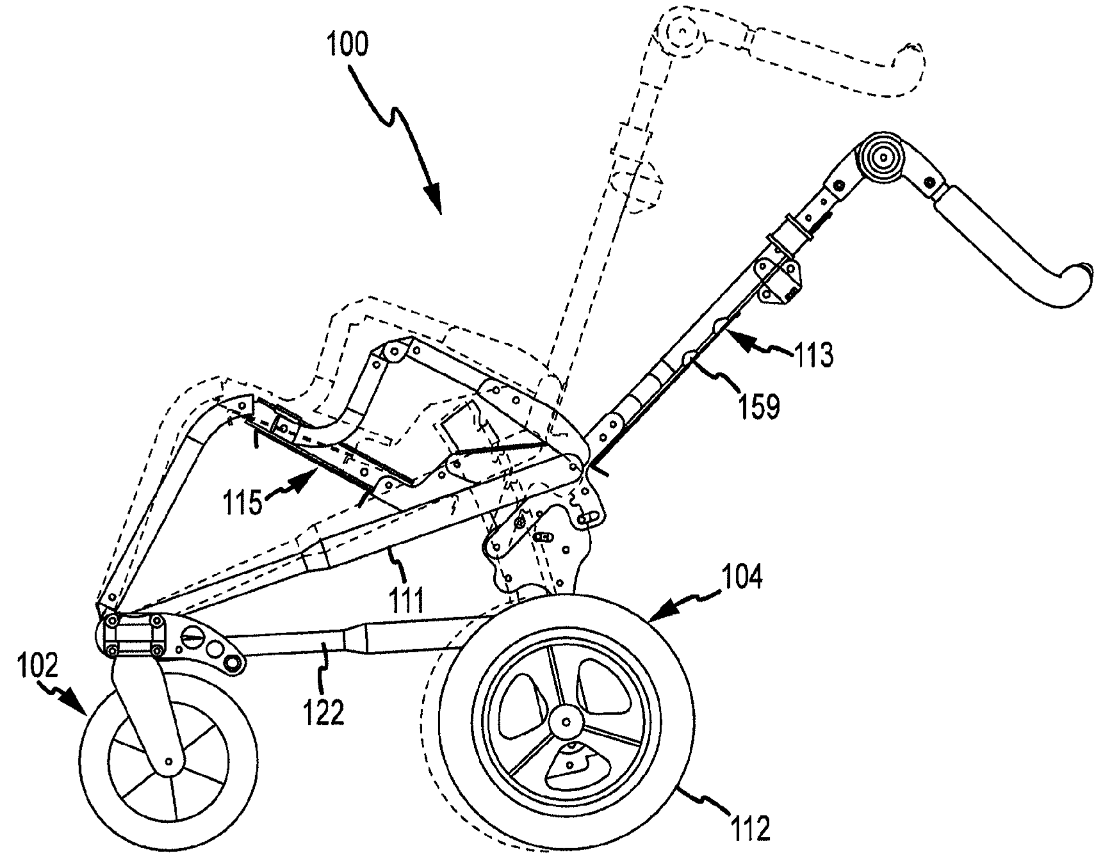
FIG. 7 is a side view illustrating a range of motion for selectably different seat back angles in accordance with an embodiment of the present disclosure.

Preferably there is a line, cable or belt, not shown, connected to the seat back tilt crossbar 129 to facilitate the lifting or removal of the seat back tilt crossbar 129 from one notch of the back tilt notches 163 into another notch by a person adjusting the wheel chair 100. The line, cable or belt is preferably mounted on the back side of the seat back 113 under the push handle 121. The movement of the seat back to seat angle is illustrated in FIG. 7

Between and separating each bracket 125, on either side of tubular back frame 159, are roll spacers 149. These three spacers 149 fix the inside and outside brackets 125 relative to each other. This spacing between the brackets 125 is substantially large enough to permit the curved rear support 116 to slidingly fit between them. The spacers 149 fit about each of the pair of curved rear supports 116 in a sturdy manner that prevents unnecessary lateral movement.

Each curved rear support 116 has a series of spaced chair tilt notches 145 at different heights along its length from its upper end. These are best seen in FIG. 2. A chair tilt crossbar 131, extending between the pairs of brackets 125 on either side of the wheel chair 100, engages the chair tilt notches 145. Each of the chair tilt notches 145 provides a different chair angle relative to the horizontal when the tilt crossbar 131 is inserted therein. The ends of the seat bottom tilt crossbar 131 fit through second slots in each of the brackets 125 and thus movement is limited to movement in the second slots. The chair tilt crossbar 131 is resiliently biased toward engaging one of the notches 145 by a spring or other elastic member to provide a bias into engagement with the notches 145. The crossbar 131 can be pulled outwardly to disengage the chair tilt notch 145, thereby permitting the entire chair portion to be moved up and down the uprights 116 to a different overall chair portion tilt position without changing the seat to back angle.

In the embodiment 100 illustrated, as the bracket 125 moves up and down the pair of curved rear supports 116, the wheel base between the pair of front wheels 106 and the pair of back wheels 112 changes. This is because of 1) the radius of curvature of the upright support members 116 and 2) the position of the link connection between the strut 122 and the extension plate 120 that is spaced from the axle 114. In an embodiment where the radius of curvature of the upright support members 116 centers about the pivot pin 170 in the front caster assemblies 108, there will be no change in the wheelbase of the chair 100 between tilt positions of the chair portion. In the embodiment shown, the radius of curvature of the upright support members 116 is shorter than the distance from the pivot pins 170. Thus there will be a change in wheelbase as is described below and shown in FIG. 6.

Figure 6:
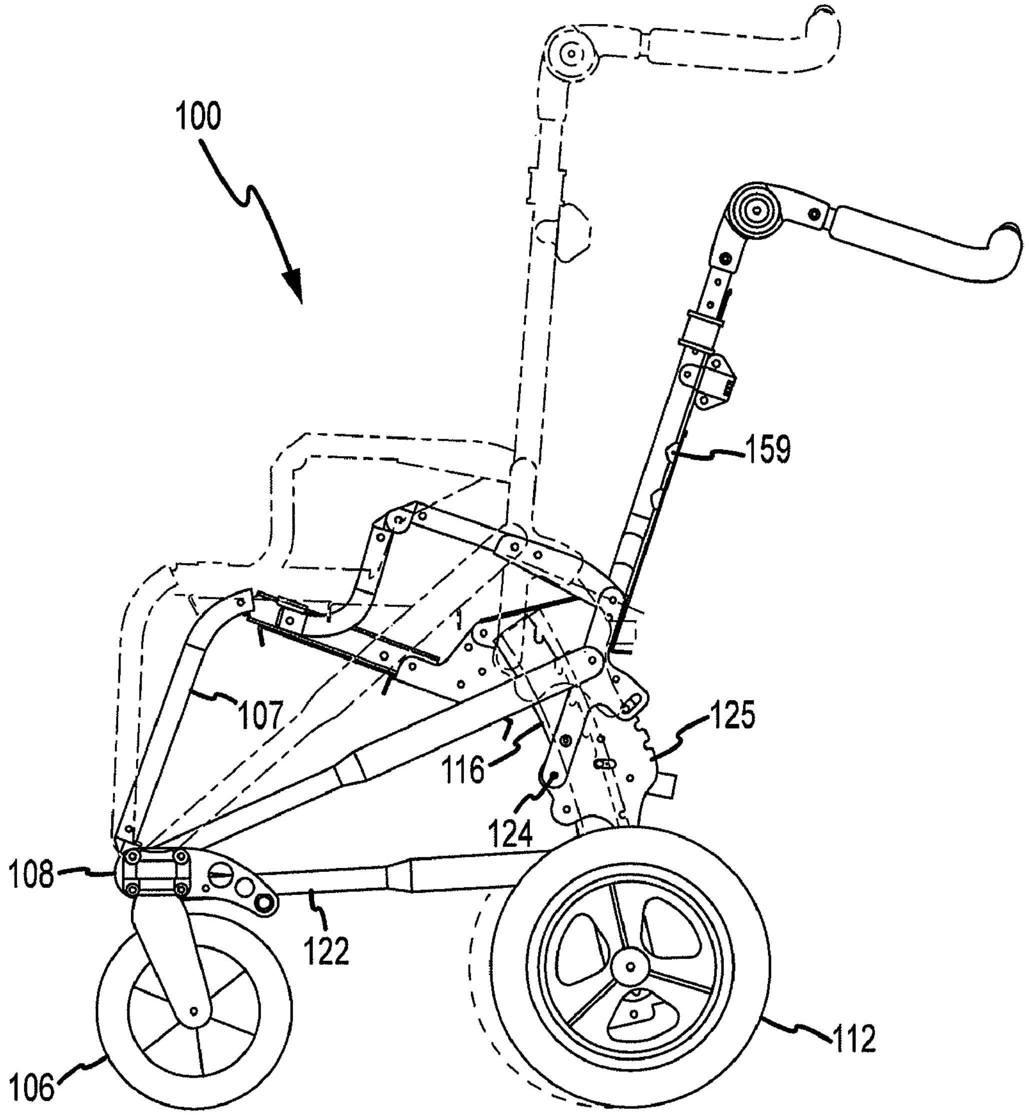
FIG. 6 is a side view illustrating a range of motion for selectably different seat angles relative to the horizontal in accordance with an embodiment of the present disclosure.

When the chair tilt crossbar 131 is in the upper most notch of the chair tilt notches 145, the seat is substantially parallel with the horizontal and the wheel base is at its minimum as is shown by the dashed lines in FIG. 6. As the chair tilt crossbar 131 moves down the pair of curved rear supports 116, into lower notches of the tilt notches 145, the wheel base becomes larger as a result of the curvature and rotation of the pair of curved rear supports 116. When the seat bottom tilt crossbar 131 is in the lowest notch of the chair tilt notches 145, the seat angle relative to the horizontal is at its maximum deviation from the horizontal and the wheel base is at its maximum length as shown by the solid lines in FIG. 6. The wheel base increases as the seat angle relative to the horizontal increases to provide increased stability as a user's center of gravity, who is sitting in the chair, is shifted backward as a result of the increased overall tilt angle.

Preferably, there is a handle, line, cable or belt connected to the chair tilt crossbar 131 to facilitate disengaging the seat bottom tilt crossbar 131 from one notch of the chair tilt notches 145 into another notch. The line, cable or belt could be located on the back side of the seat back 113 under the push handle 121.

The outer facing seat back pivot links 123 are each hinged to an upper end of one of the diagonal struts 111. The other ends of each of the diagonal struts 111 are hinged to the pivot pin 170 in the front wheel caster assemblies 108. In addition, the lower end, of upright seat supports 107 also are hinged at the pivot pin 170. This common connection point ensures that as the chair portion is moved to different tilt positions on the upright curved supports 116, the seat to back angle remains substantially constant. At the same time, as the tilt angle is changed, this in turn changes the wheelbase of the wheel chair 100 as is shown in FIG. 6. This feature provides improved stability to the wheel chair 100 as the recline tilt angle is increased. However, note that this change of wheelbase would not occur if the curvature of the upright supports 116 is centered at the pivot pins 170.

Figure 4:
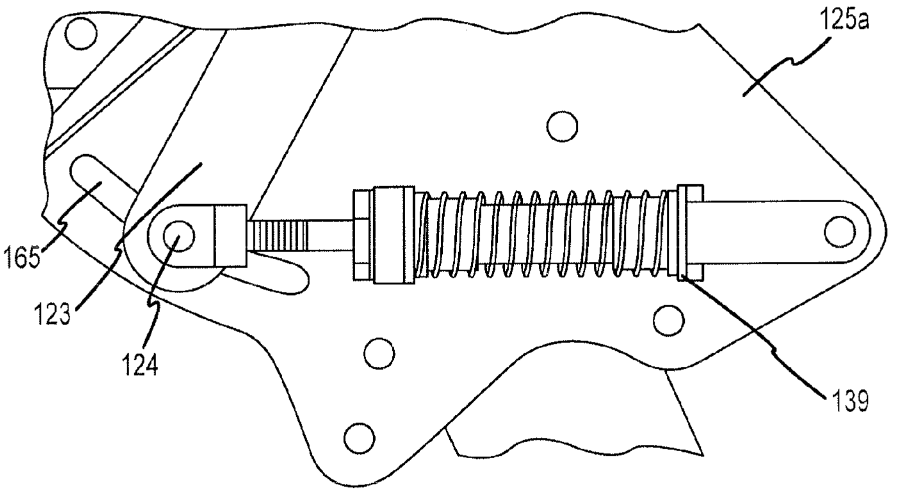
FIG. 4 shows an example of a tension option for a feature in accordance with an embodiment of the present disclosure.
Figure 5:
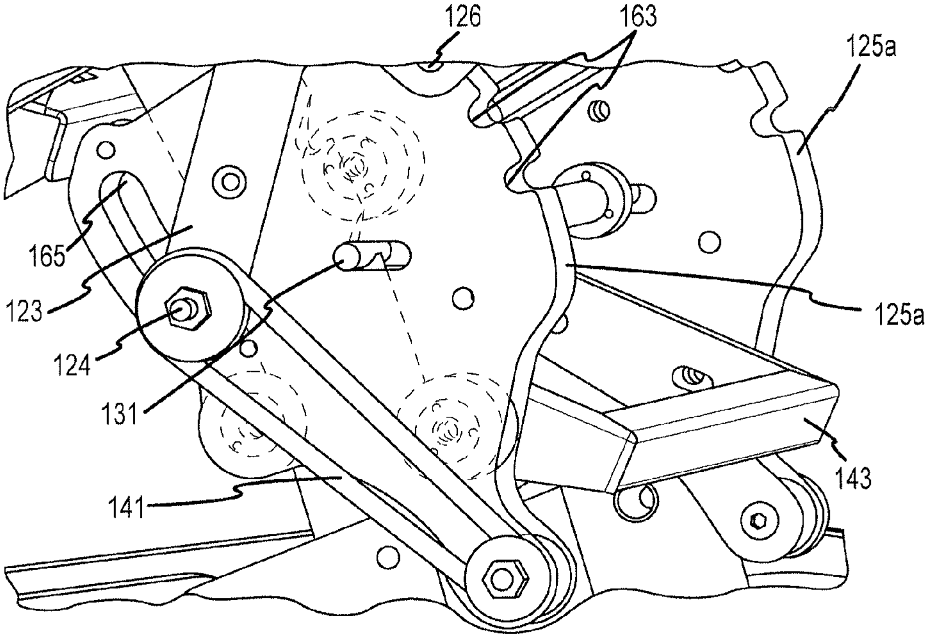
FIG. 5 shows another example of a tension option for a feature in accordance with an embodiment of the present disclosure.
Figure 8:
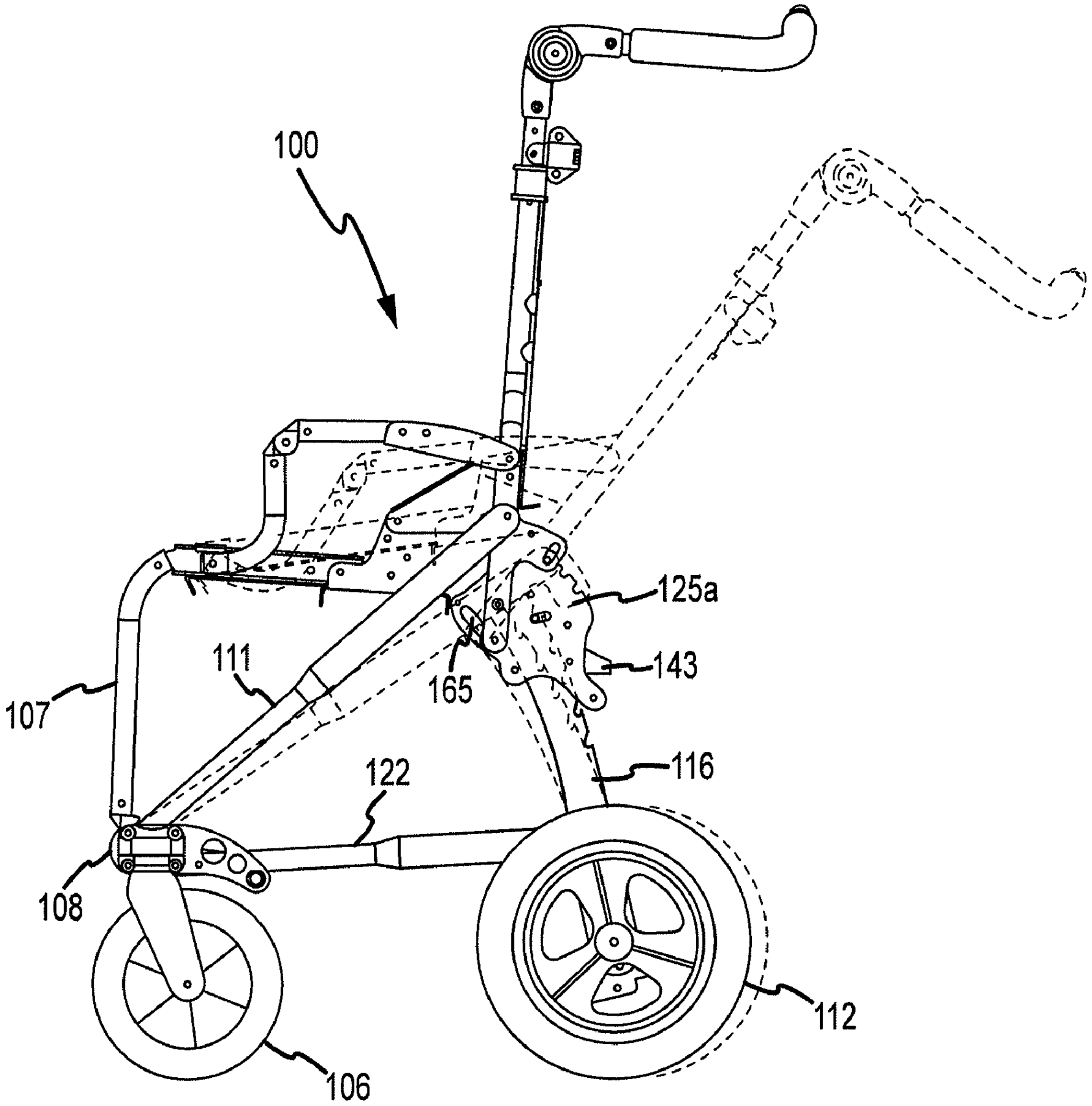
FIG. 8 is a side view illustrating a range of motion for a dynamic movement feature in accordance with an embodiment of the present disclosure.

Referring to FIGS. 4, 5 and 8, the wheel chair 100 can optionally be provided with a dynamic functionality to permit therapeutic exercise by a chair occupant. This can be accomplished by use of a modified form **125*a* of the brackets 125 as shown in FIGS. 4 and 5. This functionality is made possible by changing the hinge point of the seat back on the bracket 125*a* from connection point 124 to connection point 126. This permits the seat bottom 115 to raise upwardly as the seat back 113 opens, i.e., rotates clockwise, as seen in FIG. 8, such that the angle between the seat bottom 115 and the seat back 113 approaches 180 degrees as a user leans back to stretch for example. To facilitate this movement, there is a dynamic movement slot 165 located toward the front of the brackets 125. The outer seat back pivot links 123 include a member or pin extending substantially perpendicular to the surface of the seat back pivot links 123 for extension into the dynamic movement slot 165 for restricting the movement of the seat back pivot link 123 and subsequently the seat back frame 159 and seat back 113**.

FIGS. 4 and 5 illustrate the alternative configuration **125*a* of the brackets 125 that provide this dynamic movement feature. Each of the brackets 125*a* has an arcuate slot 165 instead of a hole for connection 124 as above described for the lower end of each of the seat back pivot links 123. A locking handle 143 for the dynamic movement feature operates a latch to release the lower end of the pivot link 123 at connection 124 from the position shown in FIG. 5, permitting the pivot link 123 to rotate about connection 126, as is shown in FIG. 4. The locking handle 143 is hinged and spring biased about a connection point (not shown) to the inner two brackets 125. In a locked position, the locking handle 143 prevents the dynamic movement by preventing the member or pin of the outer seat back pivot links 123 to move within the dynamic movement slot 165 from the connection point 124. In unlocked position, the locking handle 143 allows movement of the member or pin to move within the dynamic movement slot 165 while the link 123 rotates about connection point 126**.

The hinge plate 155 and the seat back plate 157 are hinged relative to each other to permit the angle between the seat back 113 and the seat bottom 115 to move toward 180 degrees when the locking handle 143 is in the unlocked position. As is shown in FIG. 4, springs 139 provide a restraining force against rotation about connection 126 in the dynamic mode. Alternatively, elastic bands 141, as illustrated in FIG. 5, may be utilized to establish this restraining force. Other mechanisms such as gas cylinders or pneumatic mechanisms and the like may alternatively be used to provide this function.

Figure 3:
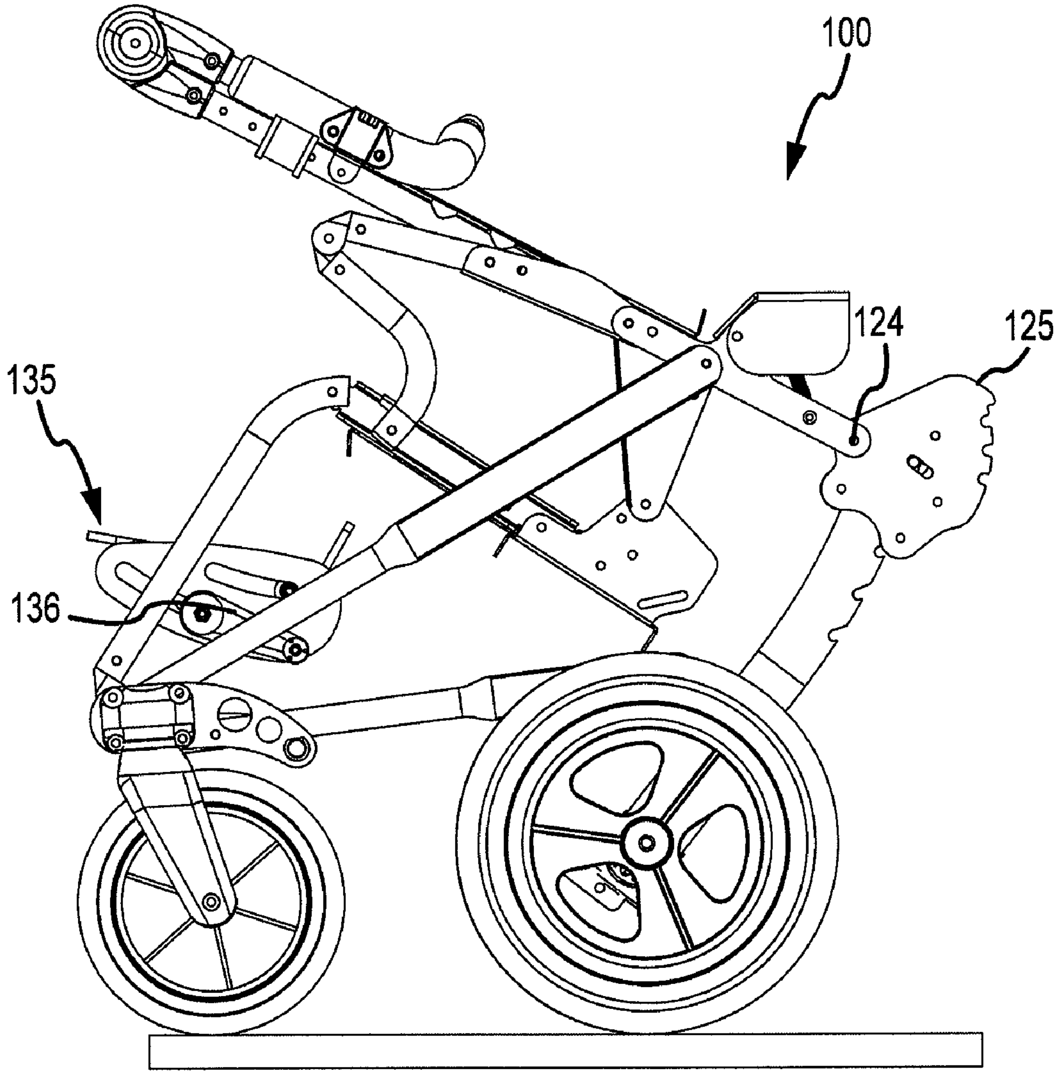
FIG. 3 is a side view of a wheel chair shown in FIGS. 1 and 2 in a partially folded position.
Figure 9:
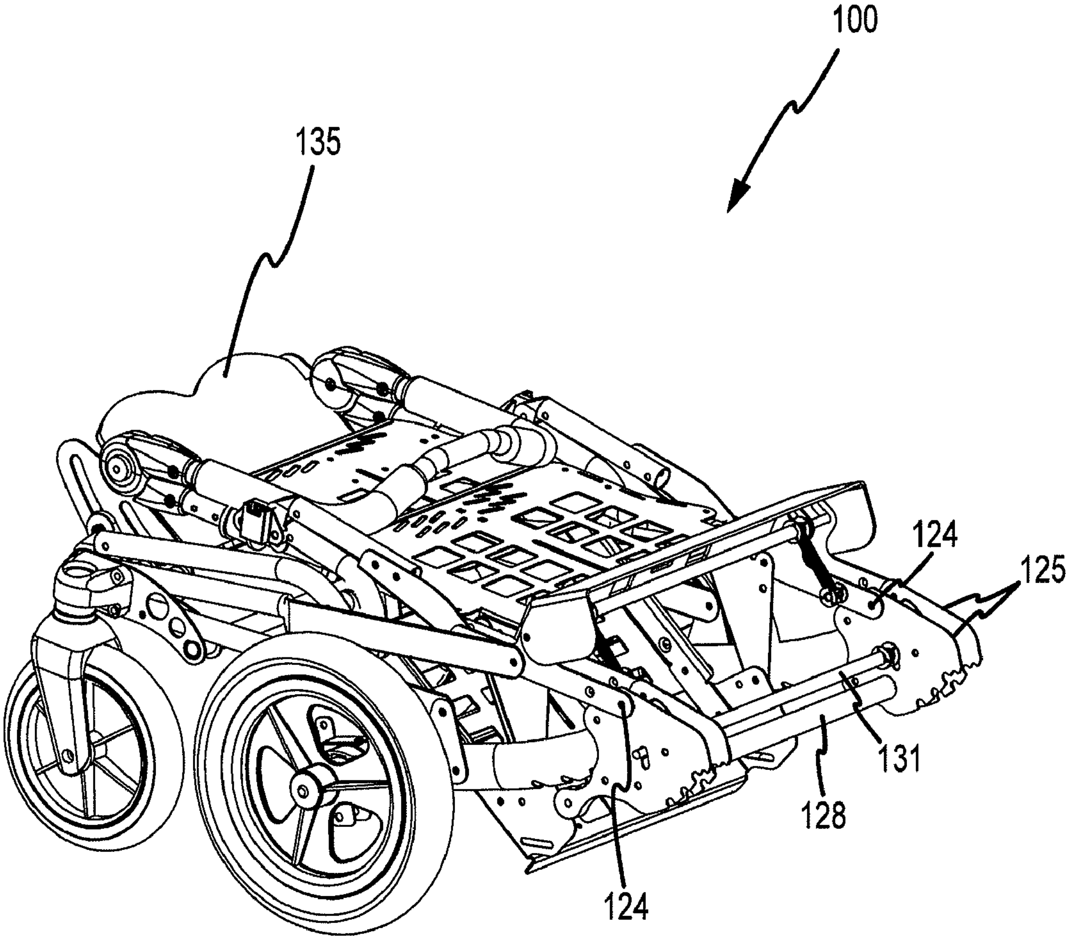
FIG. 9 is a perspective view of the embodiment shown in FIG. 3 in a fully folded configuration.

FIG. 9 illustrates the chair 100 in a fully collapsed state for storage and transport. The chair 100 folds to the collapsed state utilizing all of the same hinge joints as are used to change the seat to back angle and the chair tilt described above. FIG. 3 shows the chair 100 in a partially collapsed state. Starting as in FIG. 2, when the chair 100 is upright and not in use, the crossbar 131 is raised to disengage it from the notches 145 in the curved upright members 116 and raise the chair portion to the uppermost set of notches 145. Then the seat back tilt crossbar 129 is disengaged from the back tilt notches 163. The seat back frame 159 is then rotated forwardly about the connection points 124 of the seat back pivot links 123 to a position where the seat back 113 rotates forward and rests over the seat bottom 115. Simultaneously, the pair of substantially vertical front supports 107 and the pair of curved rear supports 116 fold rearward about the pivot pin 170 and axle 114 respectively. In this way the wheel chair 100 may be collapsed to a space saving configuration as is shown utilizing only the hinged linkages that are used during chair operation. On the other hand, during the initial stage of folding the chair, if the chair 100 is not first set with crossbar 131 positioned in the highest set of notches 145, then the upright support members 116 cannot be rotated fully. This feature acts as a safety measure, to ensure that accidental folding of the wheel chair 100 is prevented.

Figure 11:
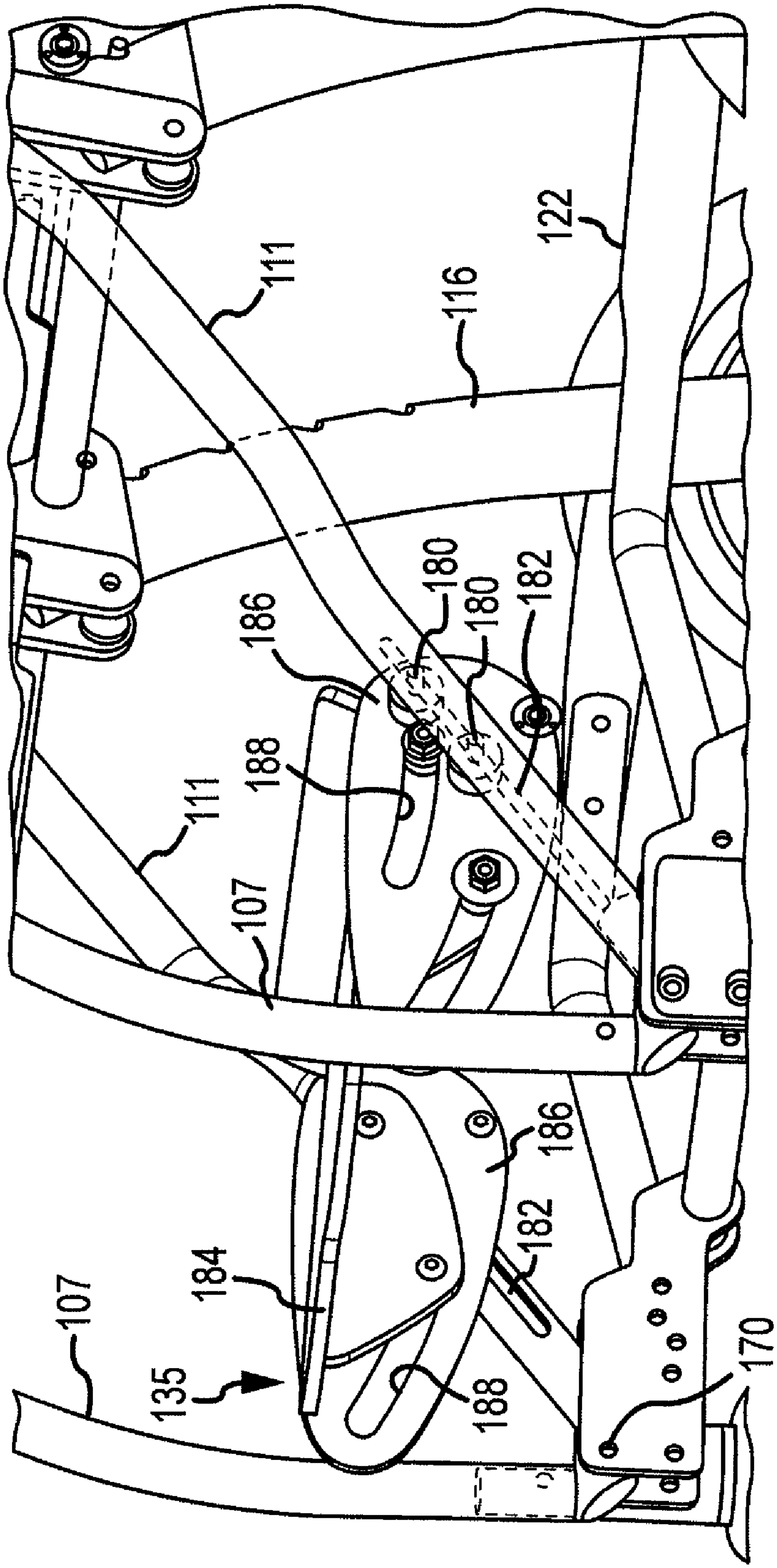
FIG. 11 is an enlarged perspective view of the wheelchair shown in FIG. 1 showing details of the foot bed structure shown in FIG. 3.

A foot bed or foot rest assembly 135 can optionally be integrated into the chair 100 as shown in FIG. 3 and the enlarged view of FIG. 11. The foot bed 135 is Integratable into the wheel chair 100 to provide lower leg support for an occupant of the chair. The foot bed 135 is adjustably attached to the diagonal struts 111 via two hand tightened bolts 180 in axial slots 182 in the struts 111. The foot bed 135 includes a flat foot support plate 184 mounted between two spaced vertical side plates 186 that are, in turn, fastened in the axial slots 182 in the struts 111. The foot support plate 184 may be fixed or slidably mounted in a pair of slots 188 in each side plate 186. Optionally, a resistance member such as an elastic band 136, as is shown in FIG. 3, may be fastened between the foot support plate 184 and the side plate 186 to provide resistance to an occupant's attempts to change the position of the foot support plate 184. The foot bed 135 is fully adjustable up and down the diagonal struts 111 to accommodate occupants of different sizes.

FIG. 6 separately shows chair portion tilt functionality of the wheel chair 100 of the present disclosure. The chair 100 is shown in dashed lines in a fully upright position and, in solid lines, in a reclined tilt position with the brackets 125 moved to a low position on the upright support members 116. As can readably be seen in FIG. 6, as the brackets 125 are shifted from higher (more upright) tilt position to the lower tilt position, the upright members 116 rotate to extend the wheelbase of the chair 100.

The wheel chair 100 of the present disclosure enables a user to choose between various seat angles relative to the horizontal by varying which seat tilt notch 145 of the pair of curved rear support members 116 that the seat tilt crossbar 131 is inserted into. An example of one possible range of motion of the seat tilt angle is illustrated in FIG. 6.

The wheel chair 100 of the present disclosure also enables the seat to back angle to be changed depending which back tilt notch 163 of the brackets 125 that the seat back tilt crossbar 129 is inserted into. An example of a possible range of motion of the seat to back angle is illustrated in FIG. 7. These two adjustments, shown in FIGS. 6 and 7, can be made together or substantially independent relative to each other. Thus, the seat angle relative to the horizontal can be at its selected most extreme adjustment and the back angle can be at its most extreme adjustment. At the same time, these adjustments, because of the linkage of support 107 and strut 111 to a common pivot pin 170 at the front wheel caster assemblies 108, cause the overall wheel base of the chair 100 to extend rearward as the angle seat to back angle is increased. This results in a more stable mobility base configuration in the reclined positions as is shown by the dashed line configuration in FIG. 7.

Alternatively, the seat to back angle can be kept constant while varying the seat angle relative to the horizontal and the seat angle relative to the horizontal can be kept substantially constant while varying the seat to back angle. The seat angle adjustment may also be referred to as a hip angle adjustment.

When the wheelchair 100 is equipped with the optional configuration of plates 125*a* shown in FIGS. 4 and 5, the wheel chair 100 of the present disclosure also permits a third adjustment feature, that of dynamic movement of the seat portion such that an occupant of the seat portion may stretch and relax, thus permitting the occupant's hips to lift as his or her back moves in a direction away from the seat bottom as above described. An example of the range of motion provided by this option is shown in FIG. 8. Here, the latched configuration of the handle 143 is shown in solid lines. The dashed lines show the stretched or dynamic range of motion about connection point 126 when the latch handle 143 releases the link 123 from the connection 124. In addition, because of the common pivot point 170 for strut 111 and support 107, this change causes a dynamic extension and contraction of the wheelbase of the wheelchair 100 as shown by the dashed lines in FIG. 8.

While the apparatus has been described in terms of what are presently considered to be the most practical and preferred embodiments, it is to be understood that the present disclosure need not be limited to the disclosed embodiments. For example, one alternative chair design in accordance with this disclosure may be configured as a "jogger". This alternative will have only one front wheel assembly 102 with one wheel 106 and correspondingly one front caster assembly 108. In such an alternative embodiment, the two upright supports 107 and the two diagonal struts 111 would all be lengthened and hinge connected via a common connection pin 170 in the front caster assembly 108. The horizontal struts 122 would also be lengthened to position the front caster assembly 108 in front of the foot support 135.

Therefore this disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A foldable wheel chair comprising:

a chair portion having a back connected to a seat at first hinges;

a frame supporting the chair portion, one or more front wheels and a pair of rear wheels;

wherein a front end of the seat pivotally attaches to the frame via a pair of front supports;

wherein a lower end of the back attaches to the frame via two spaced brackets, each bracket being slidably connected to one of a pair of spaced apart upright curved rear support members, wherein the brackets are selectively movable along the pair of upright curved rear support members to permit adjustment of the chair portion between predetermined stop positions along the upright curved rear support members to provide multiple tilt positions for the chair portion on the frame;

wherein each of the curved rear support members is attached to an axle between the pair of rear wheels; and wherein each of the one or more front wheels is spaced from one of the rear wheels by a strut hinged to one of the pair of upright curved rear support members at a position on the one of the upright curved rear support members spaced from the axle.

2. The chair of claim 1 wherein a lower end of the seat back is attached to the spaced brackets at second hinges and wherein the back can be adjustably positioned with respect to the brackets to provide predetermined seat to back angles.

3. The chair of claim 2 wherein the lower end of the seat back is removably attached to each of the brackets at the second hinges to permit dynamic movement of the seat to back angle from each of the predetermined seat to back angles while the seat back hinges about third hinges.

4. The wheel chair of claim 2 wherein the spaced brackets each includes notches for each predetermined seat to back angle position.

5. The wheel chair of claim 4 wherein a seat back pivot link is rigidly attached to each side of the lower end of the seat back and hinges to each of the brackets to form the second hinges, and the seat back pivot links are positioned by a tilt crossbar engaging the notches of the spaced brackets to determine the seat to back angles.

6. A foldable wheel chair comprising:

a chair portion having a back connected to a seat at first hinges;

a frame supporting the chair portion, one or more front wheels and a pair of rear wheels;

wherein a front end of the seat pivotally attaches to the frame via a pair of front supports;

wherein a lower end of the back attaches to the frame via two spaced brackets, each bracket being slidably connected to one of a pair of spaced apart upright curved rear support members, wherein the brackets are selectively movable along the pair of upright curved rear support members to permit adjustment of the chair portion between predetermined stop positions along the upright curved rear support members to provide multiple tilt positions for the chair portion on the frame, and further comprising a diagonal strut hinged at one end to one of the brackets and another end hinged to a common pin connecting one of the front supports to one of the front wheels.

7. The chair of claim 6 further comprising a front wheel caster assembly supporting each front wheel and wherein the common pin connects the front support and the diagonal strut to the front wheel caster assembly.

8. The chair of claim 7 wherein the first hinges are spaced from the back and the seat.

9. A foldable wheel chair comprising:

a chair portion having a back hinge connected to a seat;

a wheeled frame supporting the chair portion having one or more front wheel caster assemblies and a pair of rear wheels, wherein a portion of the seat of the chair portion attaches to the frame at common connection pins in the caster assemblies and a lower end of the back attaches to the frame via two spaced brackets, and a diagonal strut is hinge connected between each connection pin and one of the spaced brackets, each bracket being slidably connected to one of a pair of spaced apart upright curved rear support members, wherein the brackets are selectively movable along the pair of upright curved rear support members to permit tilt adjustment of the chair portion between predetermined stop positions along the upright curved rear support members to provide multiple chair tilt positions of the chair portion on the frame.

10. The chair of claim 9 wherein each of the upright curved rear support members is attached to an axle between the pair of rear wheels.

11. The chair of claim 10 and wherein each front wheel caster assembly is connected by another strut to one of the pair of upright curved rear support members at a position spaced from the axle.

12. The chair of claim 9 wherein each tilt position of the chair portion on the frame results in a corresponding different distance between the front and rear wheels.

13. The chair of claim 9 wherein each curved upright rear support member has a radius of curvature centered about one of the connection pins.

14. The chair of claim 9 wherein each of the curved upright rear support members has a radius of curvature different from a distance between the support member and the connection pins.

15. The chair of claim 9 wherein a lower end of the seat back is hinge connected to the spaced brackets at second hinges and wherein the back can be adjustably positioned with respect to the brackets to provide predetermined seat to back angles.

16. The chair of claim 15 wherein the lower end of the seat back is removably hinge connected to each of the brackets to permit dynamic movement of the seat to back angle from each of the predetermined seat to back angles by hinged movement about third hinges.

17. The wheel chair of claim 15 wherein the spaced brackets include notches for each predetermined seat to back angle and wherein there is a seat back pivot link attached to each side of the lower end of the seat back pivotable about the second hinges.

18. The wheel chair of claim 17 wherein the seat back pivot links are linked by a tilt crossbar and wherein the tilt crossbar is lockable into the notches of the spaced bracket to fix a selected seat to back angle.

19. A foldable wheel chair comprising:

a chair portion having a back hinge connected to a seat;

a wheeled frame supporting the chair portion having one or more front wheel caster assemblies and a pair of rear wheels, wherein a portion of the seat of the chair portion attaches to the wheeled frame at a connection pin in the one or more caster assemblies, a lower end of the back attaches to the wheeled frame via two spaced brackets, and a diagonal strut is hinge connected between the connection pin and one of the spaced brackets, wherein a change in angle between the seat and back causes a change in distance between the one or more front wheel caster assemblies and the rear wheels, wherein each bracket is slidably connected to one of a pair of spaced apart upright curved rear support members fastened to a rear axle connected between the rear wheels.

20. The chair according to claim 19 wherein each upright curved rear support member has a plurality of spaced notches defining predetermined stop positions along the upright curved rear support members to provide multiple chair tilt positions of the chair portion on the frame.

* * * * *